(12) United States Patent
Shteynberg et al.

(10) Patent No.: US 7,852,300 B2
(45) Date of Patent: Dec. 14, 2010

(54) CURRENT REGULATOR FOR MULTIMODE OPERATION OF SOLID STATE LIGHTING

(75) Inventors: Anatoly Shteynberg, San Jose, CA (US); Harry Rodriguez, Gilroy, CA (US)

(73) Assignee: Exclara, Inc., Santa Clara, CA (US)

( * ) Notice: Subject to any disclaimer, the term of this patent is extended or adjusted under 35 U.S.C. 154(b) by 706 days.

(21) Appl. No.: 11/701,774

(22) Filed: Feb. 2, 2007

(65) Prior Publication Data

US 2007/0182346 A1 Aug. 9, 2007

Related U.S. Application Data

(60) Provisional application No. 60/764,846, filed on Feb. 6, 2006.

(51) Int. Cl.
  *G09G 3/32* (2006.01)
  *H05B 41/16* (2006.01)
(52) U.S. Cl. .................. 345/82; 345/98; 345/212; 345/207; 345/204; 315/247; 315/200 A; 315/201; 315/312
(58) Field of Classification Search .......... 345/82–84, 345/98, 102, 204, 207, 211–214; 315/247, 315/246, 291, 297, 307–326, 185 S, 200 A, 315/149–159
See application file for complete search history.

(56) References Cited

U.S. PATENT DOCUMENTS

| 5,949,198 A * | 9/1999 | Nakamura et al. .......... 315/307 |
| 7,130,468 B1 * | 10/2006 | Meyer et al. ................. 382/219 |
| 2007/0267978 A1 * | 11/2007 | Shteynberg et al. ......... 315/247 |
| 2008/0116818 A1 * | 5/2008 | Shteynberg et al. ......... 315/192 |

* cited by examiner

*Primary Examiner*—Tuyet Thi Vo
(74) *Attorney, Agent, or Firm*—Nancy R. Gamburd; Gamburd Law Group LLC

(57) ABSTRACT

An exemplary apparatus embodiment provides a plurality of operating modes for solid state lighting, such as a flash mode and a constant or background lighting mode for use with devices such as cameras. An exemplary apparatus comprises a memory adapted to store a plurality of average current parameters; and a controller adapted to modulate an energizing cycle time period ("T") for providing power to the solid state lighting as proportional to the product of the selected average current parameter ("a") and a reset time period ("$T_R$") for an inductor current to return to a substantially zero level from a predetermined peak level ($T \propto a \cdot T_R$). The average current parameter is predetermined as substantially proportional to a ratio of a peak inductor current level ("$I_P$") to an average output D.C. current level $$("I_O") \left( a \propto \frac{I_P}{I_O} \right).$$

22 Claims, 5 Drawing Sheets

CURRENT REGULATOR FOR MULTIMODE OPERATION OF SOLID STATE LIGHTING

CROSS-REFERENCE TO A RELATED APPLICATION

This application claims priority to and is a conversion of U.S. Provisional Patent Application Ser. No. 60/764,846, filed Feb. 6, 2006, inventors Anatoly Shteynberg et al., entitled "Flash LED Driver", which is commonly assigned herewith, the contents of which are incorporated herein by reference, and with priority claimed for all commonly disclosed subject matter.

FIELD OF THE INVENTION

The present invention in general is related to power conversion, and more specifically, to a system, apparatus and method for supplying power to solid state lighting devices for operation in selected mode of a plurality of modes, such as for providing power to light emitting diodes ("LEDs") utilized for flash or background lighting in cameras and other portable devices.

BACKGROUND OF THE INVENTION

A wide variety of LED drivers or regulators are known for use in providing flash lighting for cameras. For example, Semtech (SC4501 data sheet) provides current control, but requires external loop compensation and restricts the dynamics of the converter. Such a prior art current regulator is also analog, not digital, and requires many components which compromises the efficiency of the regulator. Such decreased efficiency requires excessive power consumption which is highly detrimental for portable, battery-operated applications, such as for use in cameras and mobile telephones.

Prior art LED drivers generally have very low efficiency, making them highly unsuitable for applications in portable devices such as cameras and mobile telephones. For example, in U.S. Pat. No. 6,317,566, an electronic flash device uses current supplied from a battery through a current limiting resistor, increasing power dissipation and rendering the device very inefficient. It is also a complex device, using many components, including using a three-winding transformer for functional needs when isolation is not achieved.

Similarly, in U.S. Patent Publication No. 2005/0265709, current is also supplied through a resistor to the LEDs of a camera flash, in either a continuous low current mode or a temporary high current mode, also thereby increasing power dissipation and making this device quite inefficient.

Lastly, in U.S. Pat. No. 7,136,672, current is also supplied through selectable resistors to the LEDs of a camera flash, used with a camera of a mobile telephone. The LEDs utilized emit red, green and blue (RGB) light, and are connected to ground via a switch and a resistor, with different resistor values utilized to adjust current levels through the LEDs. Again, such use of current-limiting resistors serves to increase power dissipation and render the resulting device considerably less power efficient.

Accordingly, a need remains for a driver circuit or current regulator for solid state lighting which can provide multiple modes of operation, such as for supplying power to light emitting diodes utilized for flash or background lighting in cameras and other portable devices. Such a current regulator should provide digital control, without requiring external compensation. Lastly, such a current regulator should utilize comparatively fewer components, providing reduced cost and size, while simultaneously increasing its efficiency and enabling longer battery life when used in portable devices.

SUMMARY OF THE INVENTION

The exemplary embodiments of the present invention provide numerous advantages for supplying power to solid state lighting such as light emitting diodes. The exemplary embodiments allow multiple modes of operation, such as for supplying power to LEDs utilized for flash or background lighting in cameras and other portable devices. The exemplary current regulator embodiments provide digital control, without requiring external compensation. The exemplary embodiments do not utilize resistive impedances in the current path to the LEDs, resulting in appreciably lower power losses and increased efficiency. The exemplary current regulator embodiments also utilize comparatively fewer components, providing reduced cost and size, while simultaneously increasing efficiency and enabling longer battery life when used in portable devices.

A first exemplary current regulator embodiment provides a plurality of operating modes for solid state lighting, with the current regulator being couplable to a DC power supply, such as a battery. The exemplary current regulator comprises: a memory adapted to store a plurality of average current parameters; and a control circuit coupled to the memory, the control circuit adapted to modulate an energizing cycle time period for providing power to the solid state lighting in response to a selected average current parameter of the plurality of average current parameters.

In exemplary embodiments, each average current parameter of the plurality of average current parameters corresponds to a selected operating mode of the plurality of operating modes, such as a flash mode and a constant mode.

The control circuit, in exemplary embodiments, is further adapted to determine the energizing cycle time period ("T") as proportional to the product of the selected average current parameter ("a") and a reset time period ("$T_R$") for an inductor current to return to a substantially zero level from a predetermined peak level ($T \propto a \cdot T_R$). Each average current parameter ("a") of the plurality of average current parameters may be predetermined as substantially proportional to a ratio of a peak inductor current level ("$I_P$") to an average output D.C. current level $$(\text{``}I_O\text{''}) \left(a \propto \frac{I_P}{I_O}\right),$$

or more particularly, as substantially equal to one-half of a ratio of a peak inductor current level ("$I_P$") to an average output D.C. current level $$(\text{``}I_O\text{''}) \left(a \approx \frac{I_P}{2I_O}\right).$$

Generally, the peak inductor current level ($I_P$) and the average output D.C. current level ($I_O$) are predetermined and correspond to a selected operating mode of the plurality of operating modes.

In exemplary embodiments, the control circuit may further comprise: a first counter to provide a count corresponding to the energizing cycle time period ($T_n$); and a second counter to provide a count corresponding to the reset time period ($T_R$).

The control circuit may be further adapted to provide a next energizing cycle when a count $T_n$ of the first counter is equal to the energizing cycle time period T.

The exemplary current regulator also may further comprise: an inductor coupled to the DC power supply and coupled to the solid state lighting (typically via a diode); a switch coupled to the inductor and to the control circuit; a current sensor coupled to the switch; and a first comparator coupled to the current sensor and the control circuit; wherein the control circuit is further adapted to turn the switch on to commence an energizing cycle and to turn the switch off when the first comparator indicates that an inductor current has reached a predetermined peak level. In addition, the exemplary current regulator also may further comprise a voltage sensor; and a second comparator coupled to the voltage sensor and to the control circuit; wherein the control circuit is further adapted to determine the reset time period ($T_R$) when the second comparator indicates that a voltage level corresponding to the inductor current has decreased substantially to a zero level.

Exemplary embodiments also include a method of providing power to a solid state lighting system for a selected operating mode of a plurality of operating modes. An exemplary method comprises: starting an energizing cycle by providing current through an inductor until a predetermined peak inductor current level is reached; transferring energy stored in the inductor to the solid state lighting; determining a reset time period as a time duration for the inductor current to decrease substantially to a zero level from the peak inductor current level; determining an energizing cycle time period based on the reset time period and a predetermined average current parameter; and commencing a next energizing cycle when the energizing cycle time period has elapsed.

In the exemplary method, the determination of the energizing cycle time period further comprises determining the energizing cycle time period ("T") as proportional to the product of the predetermined average current parameter ("a") and a reset time period ("$T_R$") for an inductor current to return to a substantially zero level from a predetermined peak level ($T \propto a \cdot T_R$). The predetermined average current parameter ("a") also may be determined as substantially proportional to a ratio of a peak inductor current level ("$I_P$") to an average output D.C. current level $$("I_O") \left( a \propto \frac{I_P}{I_O} \right).$$

The predetermined average current parameter may be selected from a plurality of predetermined average current parameters, with each predetermined average current parameter corresponding to a selected operating mode of the plurality of operating modes, and may be determined by a corresponding peak inductor current level ($I_P$) of a plurality of peak inductor current levels ($I_P$) and an average output D.C. current level ($I_O$) of a plurality of and average output D.C. current levels ($I_O$).

Another exemplary embodiment includes an apparatus for providing a plurality of operating modes for solid state lighting, with the apparatus comprising: a memory adapted to store a plurality of average current parameters; and a controller coupled to the memory, the controller adapted to modulate an energizing cycle time period for providing power to the solid state lighting in response to a selected average current parameter of the plurality of average current parameters.

Yet another exemplary embodiment includes a current regulator for providing a plurality of operating modes for solid state lighting, with the current regulator couplable to a DC power supply. The exemplary current regulator comprises: an inductor coupled to the DC power supply and coupled to the solid state lighting; a switch coupled to the inductor; a current sensor coupled to the switch; a first comparator coupled to the current sensor; a voltage sensor coupled to the inductor; a second comparator coupled to the voltage sensor; a memory adapted to store a plurality of average current parameters; and a control circuit coupled to the memory and to the first and second comparators, the control circuit adapted to turn the switch on to commence an energizing cycle and to turn the switch off when the first comparator indicates that an inductor current has reached a predetermined peak level, to determine a reset time period when the second comparator indicates that a voltage level corresponding to the inductor current has decreased substantially to a zero level, and to determine an energizing cycle time period for providing power to the solid state lighting as proportional to a selected average current parameter of the plurality of average current parameters and the reset time period.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 2, divided into

DETAILED DESCRIPTION OF EXEMPLARY EMBODIMENTS

Figure 1:
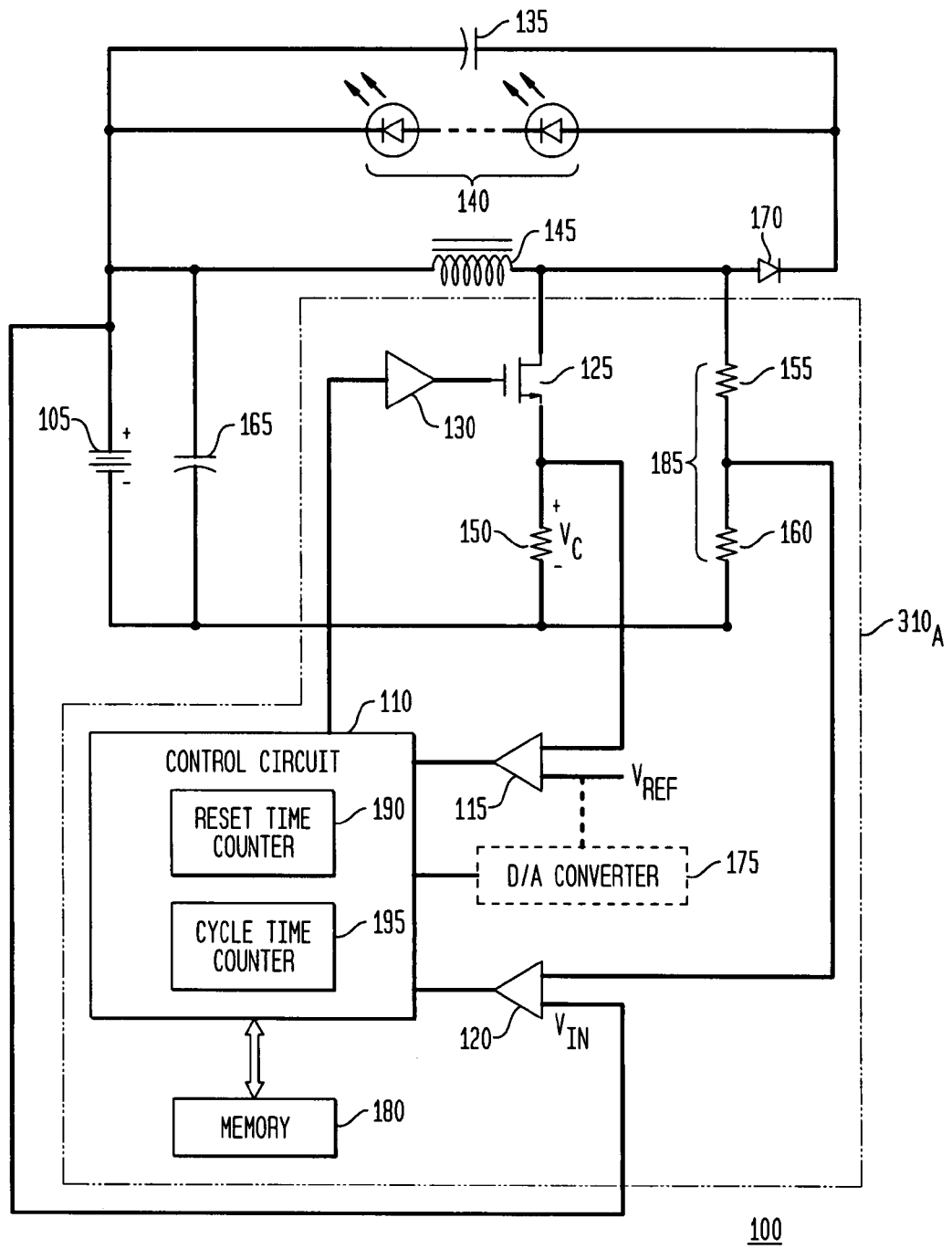
FIG. 1 is a circuit and block diagram of an exemplary first embodiment of a current regulator (or converter) in accordance with the teachings of the present invention.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

FIG. 1 is a circuit and block diagram of a first exemplary embodiment of a current regulator (or converter) 100 in accordance with the teachings of the present invention. As illustrated, the exemplary regulator 100 is coupled to a DC power supply 105, such as a battery, and to one or more LEDs 140 which, when energized as discussed below, emit light in the visible spectrum. In accordance with the present invention, the LEDs 140 may be energized in any of a plurality of modes, such as in a flash mode, to provide a high-intensity lighting pulse of comparatively short duration (such as for use as a flash for a camera or other portable device), in a constant (flashlight or "torch") mode, such as for providing comparatively lower-intensity, background lighting for comparatively longer durations, or in other modes, such as for providing lighting of any selected intensity and duration. For a flash mode, for example, the regulator 100 may generate a pulse of 4-5 msec to power LEDs 140 with a comparatively high current to provide comparatively high brightness. Also, the regulator 100 (and 300, below) provide such current regulation in an open loop system, using stored parameter values, without requiring the feedback and significant number of components of prior art current regulators. Not separately illustrated in FIG. 1 are common components for digital logic circuit, such as clocking or oscillation circuits.

The exemplary regulator 100 comprises a controller $310_A$, filter capacitors 135 and 165, inductor 145, and diode (or rectifier) 170. The controller $310_A$, illustrated as a selected instantiation of a controller 310 (of FIG. 4), comprises a control circuit (i.e., digital logic block) 110, a memory 180, comparators (a first comparator 115 and a second comparator 120), a "driving" switch 125 (typically implemented utilizing a transistor, such as the illustrated MOSFET) (which also may be operated via a buffer 130 or other driving circuit), a current sensor 150 (typically implemented as a resistor, as illustrated), and a voltage sensor 185 (typically implemented as a voltage divider (resistors 155, 160) as illustrated). Depending upon the implementation, a digital-to-analog (D/A) converter 175 may also be utilized, for example, to provide a first predetermined reference voltage level ("$V_{REF}$"). As discussed in greater detail below, the control circuit 110 typically includes two counters, a first, cycle time (T) counter 195 and a second reset time ($T_R$) counter 190. The control circuit 110 may be implemented utilizing any type of digital logic, such as a finite state machine, a controller, a processor, or any other arrangement of gates which performs the functionality discussed below.

The exemplary regulator 100 provides control over the brightness of the output of the LEDs 140 for a selected mode, such as for high-intensity flash mode or lower-intensity constant or background mode, by controlling the average current level through the LEDs 140, also as discussed below. Under the control of the control circuit 110, when the switch 125 is in an on-state and conducting (time interval "$T_{ON}$", illustrated in FIG. 2), current will flow into the inductor 145 from the DC power supply (battery) 105. The current sensor 150 senses the current level through the switch 125, and compares a corresponding voltage level "$V_C$" (e.g., across the illustrated resistor) to the first predetermined reference voltage level ($V_{REF}$). When the inductor current has reached a predetermined peak level ("$I_P$"), based upon the comparison of $V_C$ to $V_{REF}$ in first comparator 115, the control circuit 110 will turn the switch 125 off (into an off or non-conducting state, for a duration of time interval "$T_{OFF}$", illustrated in FIG. 2), and current will flow to and energize the LEDs 140 (via diode 170), providing light output of the desired intensity and duration. It should be noted that the first predetermined reference voltage level ($V_{REF}$) and the second predetermined reference voltage level (illustrated as $V_{IN}$, as an example) may be any suitable voltage levels, may be determined based upon desired current levels and resistance values (such as for resistors which may be utilized to implement current sensor 150 and voltage sensor 185), and further may be selectable by the control circuit 110 from a plurality of reference voltage levels (e.g., corresponding to a plurality of average current parameters "a", peak current parameters "$I_P$", and average output D.C. current parameters "$I_O$", discussed below).

As mentioned above, the desired output brightness intensity levels are provided through the control of the average current level (through the inductor 145 and/or LEDs 140, equivalently) by the exemplary regulator 100. In accordance with the invention, this average output D.C. current ("$I_O$") is calculated as (Equation 1):

$$I_O = \frac{I_P \cdot T_R}{2T},$$

(or, with substantial rather than exact equality $$I_O \approx \frac{I_P \cdot T_R}{2T},$$

or more generally with proportionality $$I_O \propto \frac{I_P \cdot T_R}{2T}$$

where "$I_P$" is the peak current through the inductor 145, "$T_R$" is the "reset" time (the time interval, subsequent to reaching the peak current, for the current through the inductor 145 to become substantially equal to zero), and "T" is the energizing cycle time (the period (time interval) for each cycle of energizing the LEDs 140, namely, the interval between successive switching of the switch 125 into an on-state), as illustrated in FIG. 2.

Figure 2A:
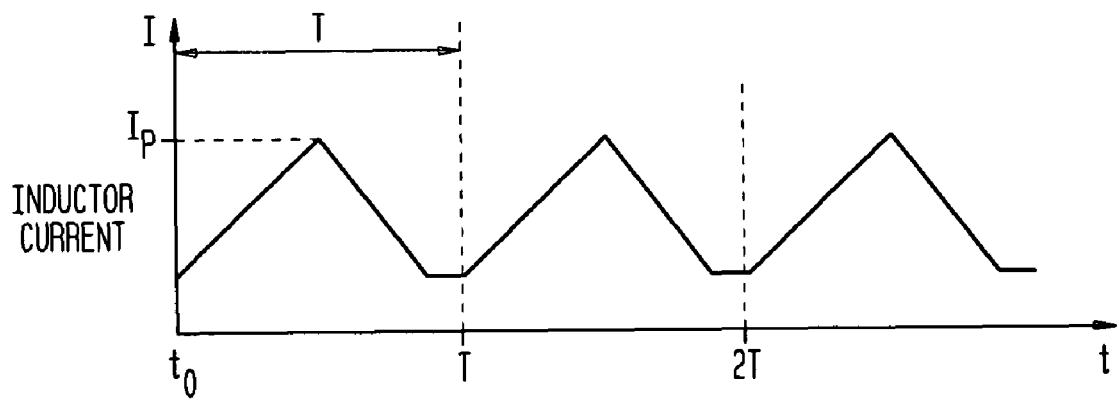
FIGS. 2A, 2B, and 2C, is a graphical diagram of current levels for an exemplary current regulator (or converter) in accordance with the teachings of the present invention.
Figure 2B:
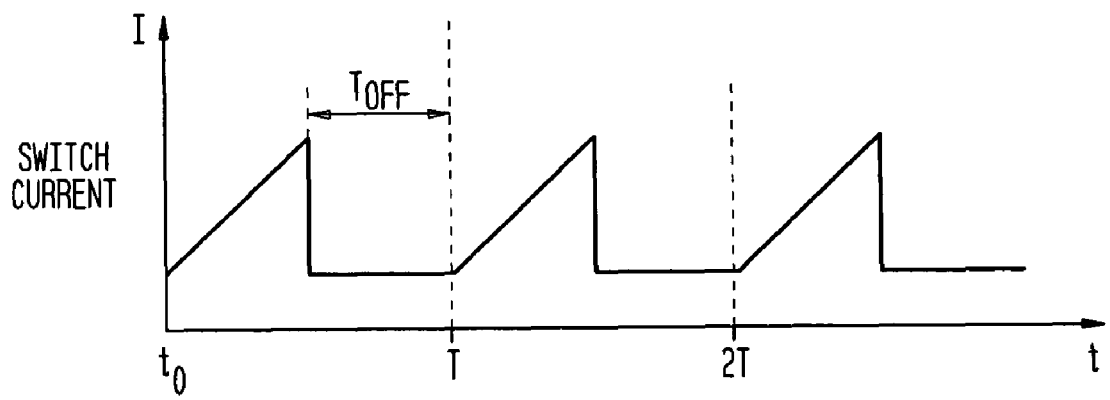
Figure 2C:
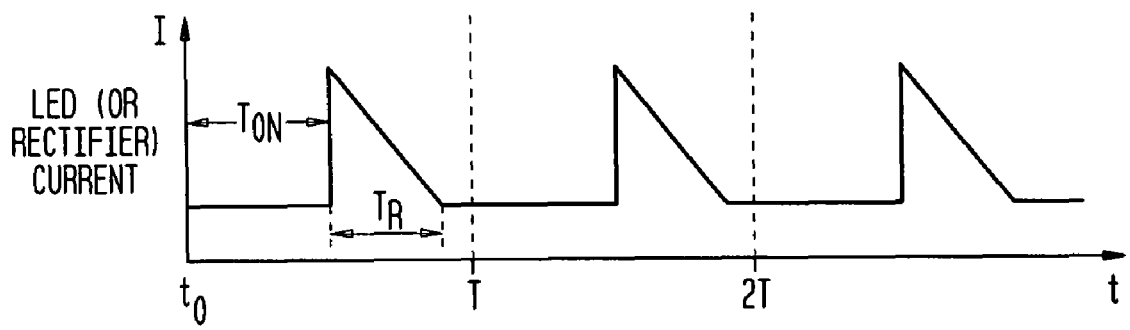

FIG. 2, divided into FIGS. 2A, 2B, and 2C, is a graphical diagram of current levels for an exemplary current regulator (or converter) in accordance with the teachings of the present invention. As illustrated in FIG. 2A, when the switch 125 is switched on and conducting (t=$t_0$), the inductor 145 current increases to the peak current $I_P$ during the $T_{ON}$ interval, then decreases to substantially zero during the reset time interval $T_R$, and will again increase beginning with the next and successive energizing cycles (t=T, 2 T, etc.). Correspondingly, FIG. 2B illustrates the current flow through the switch 125 during the $T_{ON}$ interval, and FIG. 2C illustrates the current flow through the rectifier (diode) 170 during the $T_{OFF}$ interval, which is essentially equivalent to the current flow through the LEDs 140 during this interval. (It will be understood by those of skill in the art that the illustrated current levels are idealized to convey the concepts of the present invention, and that actual current levels found in the practice of the invention will deviate from those illustrated.)

In accordance with the invention, the average output D.C. current ($I_O$) and peak inductor current ($I_P$) are predetermined values, based on the selected operating mode and desired brightness levels for the selected LEDs 140. For example, corresponding values or parameters, of a plurality of values or parameters for the average output D.C. current ($I_O$) and peak inductor current ($I_P$), are selected or predetermined for each of the various operating modes, such as flash mode, background mode, torch or flashlight mode, and so on. A predetermined "average current level" parameter "a" is then determined as proportional to the ratio of the peak inductor current level ($I_P$) to the average output D.C. current level ($I_O$), and more particularly proportional to one-half of the ratio of the peak inductor current level ($I_P$) to the average output D.C. current level ($I_O$) (Equation 2):

$$a \propto \frac{I_P}{2I_O},$$

(or with substantial or exact equality as $$a \approx \frac{I_P}{2I_O} \text{ or } a = \frac{I_P}{2I_O},$$

respectively), and corresponds to the desired average output D.C. current level ($I_O$) for the selected peak inductor current level ($I_P$) for the selected operating mode. One or more predetermined parameters "a" are then stored in memory 180, corresponding to selected modes and brightness levels, such as brightness levels for flash mode and brightness levels for a constant (or background) lighting mode. When embodied in a device such as a digital camera or mobile telephone, the user may then select the lighting mode, and the corresponding average current level parameter "a" is then utilized by the current regulating apparatus 100 (and 300, discussed below) to provide the selected lighting (i.e., operating) mode of a plurality of available operating or lighting modes.

To provide the desired average output D.C. current level ($I_O$), in accordance with the present invention, the energizing cycle time T is modulated (or varied), providing current regulation according to the relation (Equation 3):

$$T \propto a \cdot T_R.$$

Current regulation may also be provided more precisely, using substantial or exact equality, as $T \approx a \cdot T_R$ or $T = a \cdot T_R$, respectively. Also in accordance with the invention, the reset time $T_R$ is determined empirically, i.e., measured by regulator 100 (300) and the cycle time T is adjusted accordingly based on Equation 3, using a variable cycle time "$T_n$" for the current cycle "n".

Figure 3:
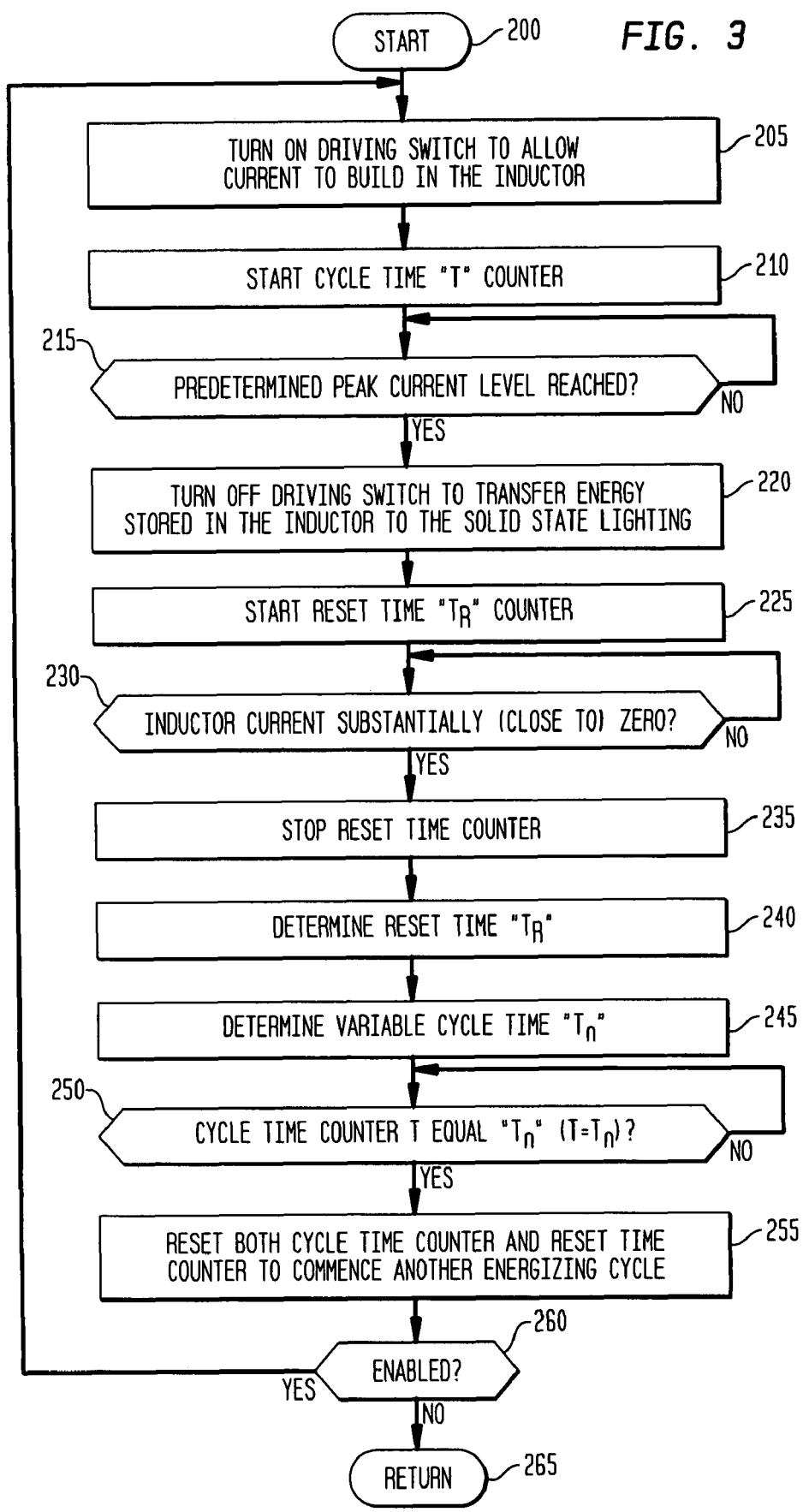
FIG. 3 is a flow chart diagram of an exemplary method embodiment for current regulation in accordance with the teachings of the present invention.

FIG. 3 is a flow chart diagram of an exemplary method embodiment for current regulation in accordance with the teachings of the present invention. Beginning with start step 200, such as when a flash mode is enabled in a digital camera and a photograph is being taken, the driving switch 125 is turned on, step 205, and the first counter (cycle time T counter) 195 is started, step 210, both typically by and under the control of the control circuit 110 of a controller $310_A$, 310. The switch 125 is maintained in an on state until the predetermined peak inductor current level $I_P$ is reached, step 215. As mentioned above, the determination of whether the peak inductor current level $I_P$ has been reached is based on comparing a corresponding first voltage level $V_C$ from current sensor (or resistor) 150 to a first predetermined reference voltage level $V_{REF}$, using first comparator 115. When the predetermined peak inductor current level $I_P$ is reached in step 215, the driving switch 125 is turned off, step 220, and the second counter (reset time $T_R$ counter) 190 is started, step 225, also both typically by and under the control of the control circuit 110 of a controller $310_A$, 310. Steps 220 and 225 may be performed concurrently, or close to concurrently. As illustrated in FIG. 2, the inductor current level then begins to decrease (to a level substantially close to zero), and may be measured using a corresponding second voltage level generated across voltage divider 185, such as by detecting a change in voltage as the magnetic field in the inductor 145 collapses. The corresponding second voltage level is then compared (in second comparator 120) to a second predetermined reference voltage level, such as $V_{IN}$ provided by the DC power supply (battery) 105, as illustrated in FIG. 1, and the comparison is utilized to determine the reset time $T_R$.

Referring again to FIG. 3, when the inductor current level is substantially close to or equal to zero in step 230, the second counter (reset time $T_R$ counter) 190 is stopped, step 235, and the reset time $T_R$ is calculated, step 240, also both typically by the control circuit 110 of a controller $310_A$, 310. Then, using the predetermined "average current level" parameter "a" and the reset time $T_R$, the variable cycle time $T_n$ is determined, step 245. In exemplary embodiments, both the reset time $T_R$ and the variable cycle time $T_n$ are determined as numerical counts corresponding to their respective time intervals. Also in the exemplary embodiments, the variable cycle time $T_n$ is determined by the control circuit using Equation 3, namely: $T_n = a \cdot T_R$ (step 245). Next, when the count value of the first counter (cycle time T counter) 195 is equal to the variable cycle time $T_n$ in step 250, the first and second counters 195, 190 are reset, and when enabled, step 260, the method continues and a new cycle starts, returning to step 205 to turn on the driving switch for another, next cycle of energizing the LEDs 140. When no longer enabled in step 260, the method may end, return step 265.

The exemplary embodiments of the invention provide digital control over the desired average output D.C. current level ($I_O$), based on the selected operating mode and desired brightness levels for the selected LEDs 140, by modulating the cycle time T of the energizing of the LEDs 140. Stated another equivalent way, for a selected peak inductor current level ($I_P$) and desired average output D.C. current level ($I_O$), given that the reset time $T_R$ is dependent upon the inductance value of the inductor 145 and other operating parameters of the selected LEDs 140, and given that the on-time $T_{ON}$ of the switch 125 is also determined by the inductance value of the inductor 145 and the selected peak inductor current level ($I_P$), the present invention effectively varies the off-time of the switch 125 to provide control over the average output D.C. current level ($I_O$) provided to the LEDs 140, and corresponding light output for the selected operating mode.

In addition, the exemplary embodiments allow current to be sourced independently of the impedance, i.e., independently of the number of diodes comprising LEDs 140. This current regulation is also provided in an open-loop system, without requiring measurement of the current levels through the LEDs 140, thereby eliminating corresponding power losses, and extending battery life (particularly valuable for portable applications, such as for cameras, mobile telephones, notebook computers, and personal digital assistants).

Figure 4:
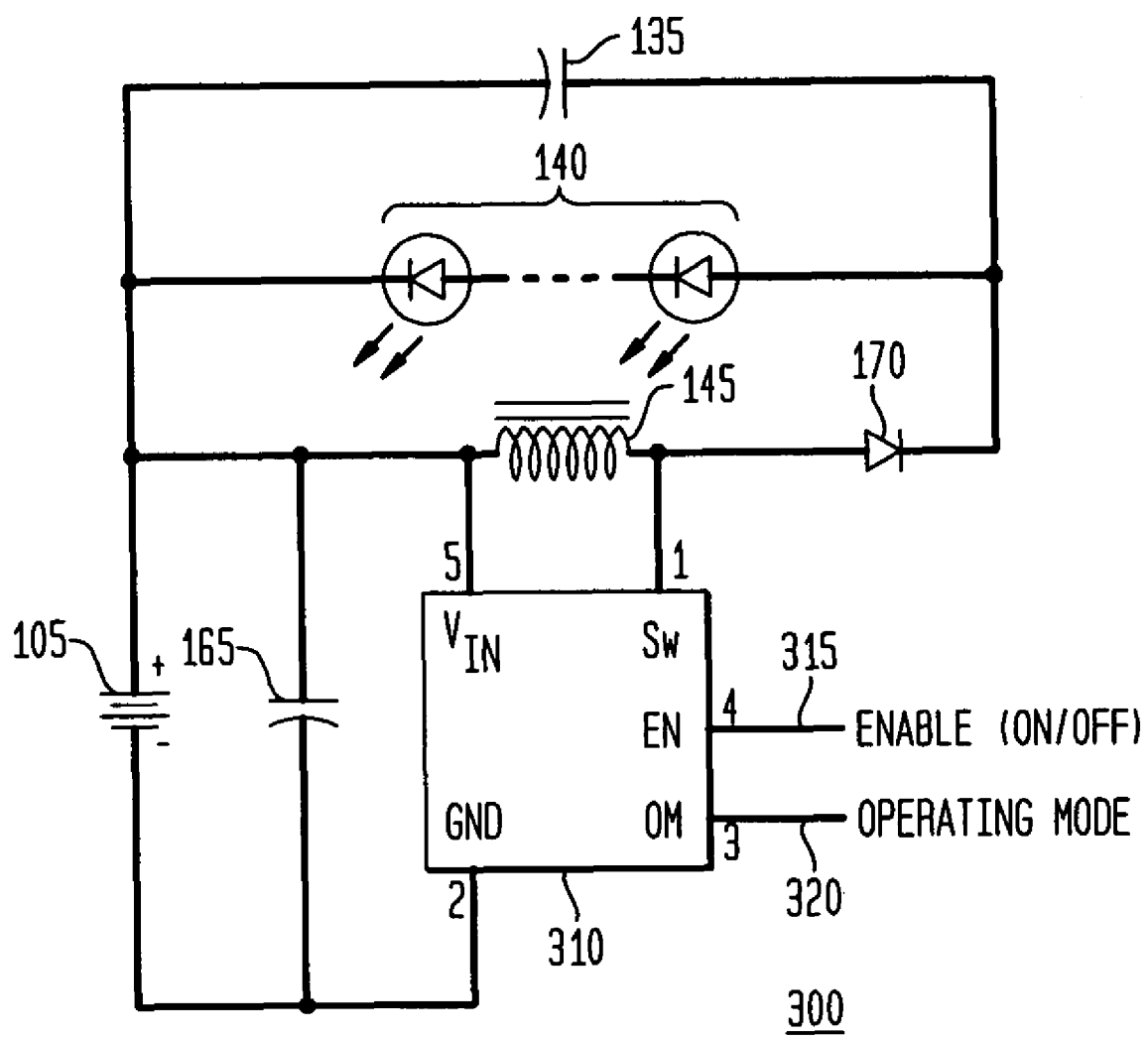
FIG. 4 is a circuit and block diagram of an exemplary second embodiment of a current regulator (or converter) in accordance with the teachings of the present invention.

FIG. 4 is a circuit and block diagram of an exemplary second embodiment of a current regulator (or converter) 300 in accordance with the teachings of the present invention. The current regulator 300 operates as previously discussed with respect to regulator 100. As illustrated in FIG. 4, a controller 310 is utilized to provide the control, measurements, counts and calculations discussed above, with the illustrated pin connections 1, 2, 3, 4, and 5 to the balance of the current regulating circuit, with controller $310_A$ of FIG. 1 being a selected embodiment or instantiation of controller 310. User inputs are provided to the controller 310, for the user to select the desired operating mode, illustrated as an enable input (on/off) 315, and an operating mode input 320, such as for selection of flash or constant lighting modes.

Figure 5:
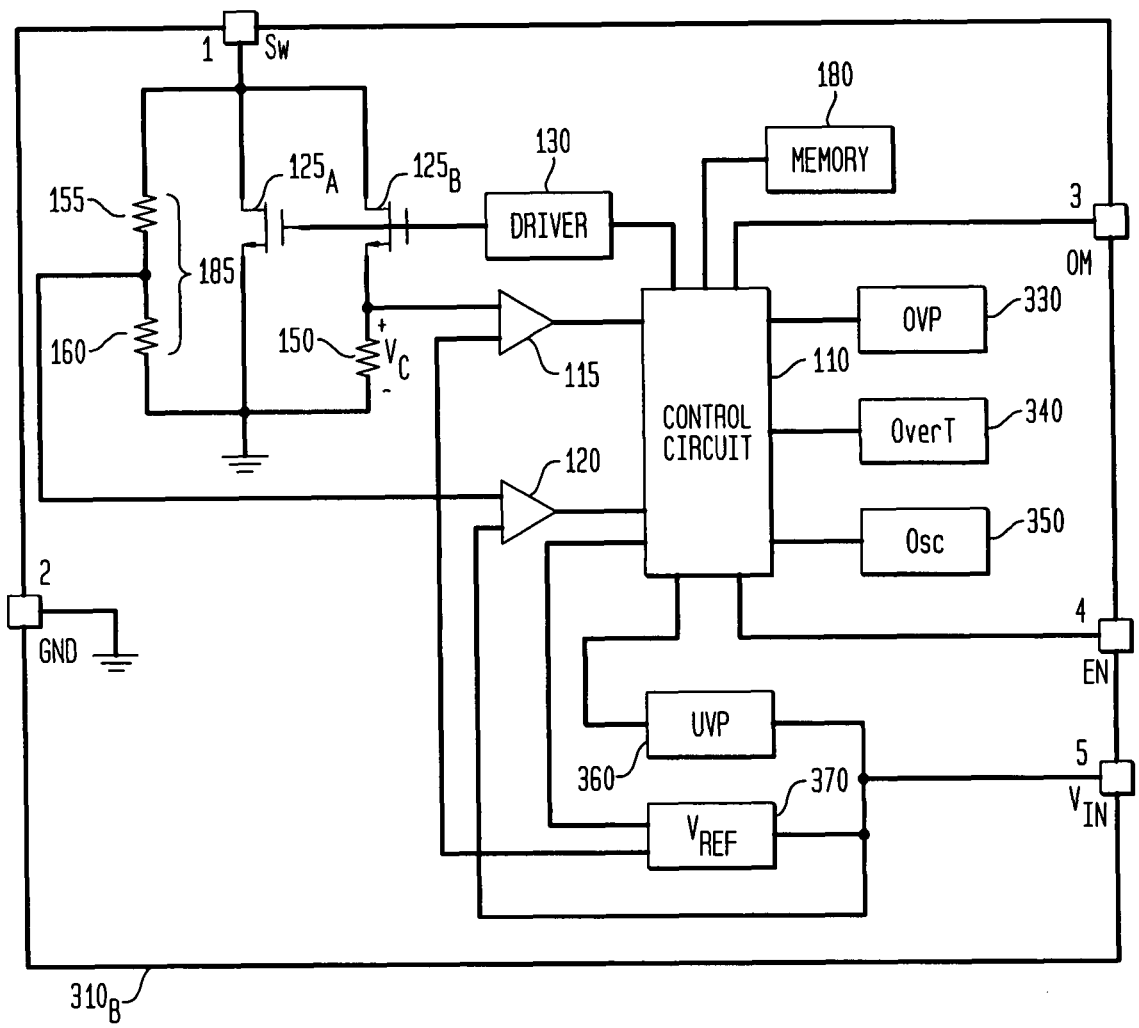
FIG. 5 is a circuit and block diagram of an exemplary controller utilized for a current regulator (or converter) in accordance with the teachings of the present invention.

FIG. 5 is a circuit and block diagram of an exemplary controller $310_B$ utilized for a current regulator (or converter) 100, 300 in accordance with the teachings of the present invention, and operates to provide current regulation as previously discussed. In this exemplary embodiment, controller $310_B$ also includes additional, desirable features for embodiment within various devices, such as within cameras and mobile telephones, for example. As illustrated in FIG. 5, switch 125 is implemented utilizing two MOSFET transistors $125_A$ and $125_B$. A first predetermined voltage reference $V_{REF}$ is generated in block 370, and may be implemented as a voltage divider, for example, and may be selectable by the control circuit 110, such as to set different references voltage levels to correspond to a selected operating mode. The second predetermined reference voltage level also utilizes VIN, as illustrated, although those of skill in the art will recognize that other reference voltage levels may be utilized equivalently. Over-voltage and over-temperature protection are provided in blocks 330 and 340, respectively, while an input clock signal is provided by oscillator 350. Under-voltage protection is provided in block 360, which monitors the voltage ($V_{IN}$) provided by the DC power supply (e.g., battery) 105 and if too low, is adapted to turn off the apparatus 100, 300 to avoid depleting or ruining the battery. The illustrated memory 180 may include stored values for the average current parameters "a", or may include means (not separately illustrated) to supply such values from external source.

Numerous advantages of the present invention for providing power to solid state lighting, such as light emitting diodes, are readily apparent. The exemplary embodiments allow multiple modes of operation, such as for providing power to LEDs utilized for flash or background lighting in cameras and other portable devices. The exemplary current regulator embodiments provide digital control, without requiring external compensation. The exemplary current regulator embodiments also utilize comparatively fewer components, providing reduced cost and size, while simultaneously providing increased efficiency and enabling longer battery life when used in portable devices.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

As used herein for purposes of the present invention, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light emitting polymers, organic LEDs, and so on, including within the visible spectrum, or other spectra such as ultraviolet or infrared, of any bandwidth, or of any color or color temperature.

A "controller" or "processor" 310 may be any type of controller or processor, and may be embodied as one or more controllers 310, adapted to perform the functionality discussed herein. As the term controller or processor is used herein, a controller 310 may include use of a single integrated circuit ("IC"), or may include use of a plurality of integrated circuits or other components connected, arranged or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term controller (or processor) should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM or $E^2$PROM. A controller (or processor) (such as controller 310), with its associated memory, may be adapted or configured (via programming, FPGA interconnection, or hard-wiring) to perform the methodology of the invention, as discussed below. For example, the methodology may be programmed and stored, in a controller 310 with its associated memory (and/or memory 180) and other equivalent components, as a set of program instructions or other code (or equivalent configuration or other program) for subsequent execution when the processor is operative (i.e., powered on and functioning). Equivalently, when the controller 310 may implemented in whole or part as FPGAs, custom ICs and/or ASICs, the FPGAs, custom ICs or ASICs also may be designed, configured and/or hard-wired to implement the methodology of the invention. For example, the controller 310 may be implemented as an arrangement of controllers, microprocessors, DSPs and/or ASICs, collectively referred to as a "controller", which are respectively programmed, designed, adapted or configured to implement the methodology of the invention, in conjunction with a memory 180.

The memory 180, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a controller 310 or processor IC), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer readable media includes any form of communication media which embodies computer readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on. The memory 180 may be adapted to store various look up tables, parameters, coefficients, other information and data, programs or instructions (of the software of the present invention), and other types of tables such as database tables.

As indicated above, the controller 310 is programmed, using software and data structures of the invention, for example, to perform the methodology of the present invention. As a consequence, the system and method of the present invention may be embodied as software which provides such programming or other instructions, such as a set of instructions and/or metadata embodied within a computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the controller 310, for example).

The software, metadata, or other source code of the present invention and any resulting bit file (object code, database, or look up table) may be embodied within any tangible storage medium, such as any of the computer or other machine-readable data storage media, as computer-readable instructions, data structures, program modules or other data, such as discussed above with respect to the memory 180, e.g., a floppy disk, a CDROM, a CD-RW, a DVD, a magnetic hard drive, an optical drive, or any other type of data storage apparatus or medium, as mentioned above.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

The invention claimed is:

1. A current regulator for providing a plurality of operating modes for solid state lighting, the current regulator couplable to a DC power supply, the current regulator comprising:
    a memory to store a plurality of average current parameters; and
    a control circuit coupled to the memory, the control circuit to modulate an energizing cycle time period ("T") for providing power to the solid state lighting in response to a selected average current parameter ("a") of the plurality of average current parameters by determining the energizing cycle time period as proportional to the product of the selected average current parameter and a reset time period ("$T_R$") for an inductor current to return to a substantially zero level from a predetermined peak level ($T \propto a \cdot T_R$).

2. The current regulator of claim 1, wherein each average current parameter of the plurality of average current parameters corresponds to a selected operating mode of the plurality of operating modes.

3. The current regulator of claim 1, wherein the plurality of operating modes comprises a flash mode and a constant mode.

4. The current regulator of claim 1, wherein each average current parameter ("a") of the plurality of average current parameters is predetermined as substantially equal to one-half of a ratio of a peak inductor current level ("$I_P$") to an average output D.C. current level $$("I_O")\left(a \approx \frac{I_P}{2I_O}\right).$$

5. The current regulator of claim 1, wherein each average current parameter ("a") of the plurality of average current parameters is predetermined as substantially proportional to a ratio of a peak inductor current level ("$I_P$") to an average output D.C. current level $$("I_O")\left(a \propto \frac{I_P}{I_O}\right).$$

6. The current regulator of claim 5, wherein the peak inductor current level ($I_P$) and the average output D.C. current level ($I_O$) are predetermined and correspond to a selected operating mode of the plurality of operating modes.

7. The current regulator of claim 1, wherein the control circuit further comprises:
a first counter to provide a count corresponding to the energizing cycle time period ($T_n$); and
a second counter to provide a count corresponding to the reset time period ($T_R$).

8. The current regulator of claim 7, wherein the control circuit further is to provide a next energizing cycle when a count $T_n$ of the first counter is equal to the energizing cycle time period T.

9. The current regulator of claim 1, further comprising:
an inductor coupled to the DC power supply and coupled to the solid state lighting;
a switch coupled to the inductor and to the control circuit;
a current sensor coupled to the switch; and
a first comparator coupled to the current sensor and the control circuit;
wherein the control circuit further is to turn the switch on to commence an energizing cycle and to turn the switch off when the first comparator indicates that an inductor current has reached a predetermined peak level.

10. The current regulator of claim 9, further comprising:
a voltage sensor; and
a second comparator coupled to the voltage sensor and to the control circuit;
wherein the control circuit further is to determine the reset time period ($T_R$) when the second comparator indicates that a voltage level corresponding to the inductor current has decreased substantially to a zero level.

11. An apparatus for providing a plurality of operating modes for solid state lighting, the apparatus comprising:
a memory to store a plurality of average current parameters; and
a controller coupled to the memory, the controller to modulate an energizing cycle time period ("T") for providing power to the solid state lighting in response to a selected average current parameter ("a") of the plurality of average current parameters by determining the energizing cycle time period as proportional to the product of the selected average current parameter and a reset time period ("$T_R$") for an inductor current to return to a substantially zero level from a predetermined peak level ($T \propto a \cdot T_R$).

12. The apparatus of claim 11, wherein each average current parameter of the plurality of average current parameters corresponds to a selected operating mode of the plurality of operating modes.

13. The apparatus of claim 11, wherein the plurality of operating modes comprises a flash mode and a constant mode.

14. The apparatus of claim 11, wherein each average current parameter ("a") of the plurality of average current parameters is predetermined as substantially equal to one-half of a ratio of a peak inductor current level ("$I_P$") to an average output D.C. current level $$("I_O")\left(a \approx \frac{I_P}{2I_O}\right).$$

15. The apparatus of claim 11, wherein the controller further comprises:
a first counter to provide a count corresponding to the energizing cycle time period ($T_n$); and
a second counter to provide a count corresponding to the reset time period ($T_R$).

16. The apparatus of claim 15, wherein the controller further is to provide a next energizing cycle when a count $T_n$ of the first counter is equal to the energizing cycle time period T.

17. The apparatus of claim 11, further comprising:
an inductor coupled to the DC power supply and coupled to the solid state lighting;
and wherein the controller further comprises:
a control circuit;
a switch coupled to the inductor and to the control circuit;
a current sensor coupled to the switch; and
a first comparator coupled to the current sensor and the control circuit;
wherein the control circuit is to turn the switch on to commence an energizing cycle and to turn the switch off when the first comparator indicates that an inductor current has reached a predetermined peak level.

18. The apparatus of claim 17, wherein the controller further comprises:
a voltage sensor; and
a second comparator coupled to the voltage sensor and to the control circuit;
wherein the control circuit further is to determine the reset time period ($T_R$) when the second comparator indicates that a voltage level corresponding to the inductor current has decreased substantially to a zero level.

19. The apparatus of claim 11, wherein each average current parameter ("a") of the plurality of average current parameters is predetermined as substantially proportional to a ratio of a peak inductor current level ("$I_P$") to an average output D.C. current level $$("I_O") \left( a \propto \frac{I_P}{I_O} \right).$$

20. The apparatus of claim 19, wherein the peak inductor current level ($I_P$) and the average output D.C. current level ($I_O$) are predetermined and correspond to a selected operating mode of the plurality of operating modes.

21. The apparatus of claim 19, wherein each predetermined average current parameter is determined by a corresponding peak inductor current level ($I_P$) of a plurality of peak inductor current levels ($I_P$) and an average output D.C. current level ($I_O$) of a plurality of and average output D.C. current levels ($I_O$).

22. A current regulator for providing a plurality of operating modes for solid state lighting, the current regulator couplable to a DC power supply, the current regulator comprising:

an inductor coupled to the DC power supply and coupled to the solid state lighting;
a switch coupled to the inductor;
a current sensor coupled to the switch;
a first comparator coupled to the current sensor;
a voltage sensor coupled to the inductor;
a second comparator coupled to the voltage sensor;
a memory to store a plurality of average current parameters; and
a control circuit coupled to the memory and to the first and second comparators, the control circuit to turn the switch on to commence an energizing cycle and to turn the switch off when the first comparator indicates that an inductor current has reached a predetermined peak level, to determine a reset time period when the second comparator indicates that a voltage level corresponding to the inductor current has decreased substantially to a zero level, and to determine an energizing cycle time period for providing power to the solid state lighting as proportional to a selected average current parameter of the plurality of average current parameters and the reset time period.

* * * * *